3,036,019
MODIFICATION OF SILICON-NITROGEN CONTAINING COMPOUNDS

Hyman M. Molotsky, Chicago, William M. Boyer, Tinley Park, and Harlan E. Tarbell, Jr., Elmhurst, Ill., assignors to The Richardson Company, Melrose Park, Ill., a corporation of Ohio
No Drawing. Filed Nov. 3, 1958, Ser. No. 771,239
6 Claims. (Cl. 260—2)

This invention is concerned with new compositions of matter and, more particularly, with resinous compositions containing a silicon-nitrogen linkage in the repeating units of the resin.

As is disclosed in a number of patents to Nicholas D. Cheronis, such as Patent 2,579,418, dated December 18, 1951, a particular class of compositions may be prepared by reacting ammonia or a primary amine with a halosilane. Such a reaction results in replacing the halogen atom attached directly to a silicon atom with an amino group. The halosilanes may be represented, in general, by the generic formula:

$$R_nSiHal_{4-n}$$

wherein "R" is an organic radical such as an alkyl group, allyl group, aryl group, or the like. "Hal" represents halogen and "$n$" is a number from 0–3. The halogen preferably used is chlorine. The resulting amino compositions are considered to have the following general formulas:

$$R_nSi(NH_2)_{4-n} \text{ or } R_nSi(NHR')_{4-n}$$

depending on whether the halosilane was reacted with ammonia or an amine. However, many of the reaction products tend to undergo an intrapolymerization as discussed more in detail hereinafter. The foregoing reactions are normally conducted at room temperature or below in the presence of an inert solvent and in the absence of water to prevent hydrolysis.

In many instances, the number of replaceable halogen atoms attached directly to the silicon atom and the number of amino groups substituted for such atoms is referred to in terms of functionality. For example, if the halosilane contains one replaceable halogen atom, such a halosilane would be referred to as monofunctional. The resultant ammonolysis or aminolysis reaction products would also be referred to as monofunctional. Likewise, halosilanes having two or three replaceable halogen atoms would be referred to as being di or trifunctional compounds, respectively, as would their corresponding ammonia or primary amine reaction products.

The ammonolysis or aminolysis of a monofunctional halosilane will give the singular anticipated silicon-nitrogen compound. However, as indicated above, it has been found that the tetrafunctional and many of the di and trifunctional ammonolysis or aminolysis reaction products of the corresponding halosilanes, as well as similar products from mixed halosilanes, tend to undergo an intrapolymerization at room temperature, forming either liquids or solids, depending on the particular starting materials. In fact, it has been found difficult or impossible to isolate many of the monomers of the higher functional reaction products. It is understood that the intrapolymerization occurs by means of a condensation reaction with the liberation of ammonia. Intrapolymerization reactions, involving difunctional reaction products, particularly those containing alkyl groups, are believed to form, in general, cyclic trimers or tetramers, whereas intrapolymerization reactions involving the higher functional silicon-nitrogen compounds, tend to form straight or branched chain polymers, believed to consist of a plurality of cyclic rings linked together. When mixtures of halosilanes of different functionality are ammonolyzed or aminolyzed, mixtures of separate polymers or copolymer hybrids may be formed, depending on the type of halosilanes used.

Certain distinctions may be made with respect to ammonolysis as compared to aminolysis in that, in the latter type of a reaction, there is less of a tendency for the reaction products to polymerize to the extent that shorter polymers may be produced. Hence, some degree of control of end products may be obtained by appropriate selection of the initial reactants. Reaction products of ammonia or amines with halosilanes, and particularly the aforementioned polymers, are sometimes referred to as "silamines" or "aminosilanes." The former term will, at times, be used in this specification.

Silamines, in many instances, may be used directly without further modification to form films, coatings, or molded products. In addition, silamines may be modified to obtain additional properties desired in an end product or may be used as modifying agents for other compounds. In the copending application of Shultz et al., Serial No. 670,631, filed July 9, 1957, there has been disclosed and claimed the use of silamines to modify or cure epoxy resins. It has now been discovered that certain types of silamines, when further modified with selected amines in the manner hereinafter disclosed, permit the formation of resinous compositions having improved properties, particularly for use in forming films and molding compositions. Further, it has also been found that certain silamines may be modified with the aforementioned selected amines to produce intermediate compositions which can be further modified to obtain new resinous compositions having improved characteristics.

Accordingly, this invention is directed primarily to the modification of trifunctional silamines and trifunction-difunctional silamine blends or copolymer hybrids with selected amines, but also includes similar modifications of blends or hybrids having some degree of tetrafunctionality. Further, it is, in general, contemplated that the amine reactions will involve the polymer-type silamines characterized by the presence of an $$-\underset{|}{\overset{|}{Si}}-NH-\underset{|}{\overset{|}{Si}}-$$

linkage, however, it is also within the scope of the invention that amines, may, likewise, be reacted with silamine monomers where such monomers can be isolated and where the resulting reaction products may be converted subsequently to polymers.

As is previously indicated hereinabove, trifunctional silamines are obtained by reacting ammonia or primary amine with a halosilane having three replaceable halogen atoms attached to the silicon atom, the other valence of the silicon atom being taken up by an organic group. The trifunctional ammonolysis or aminolysis reaction products of halosilanes, in many instances, are found to polymerize simultaneously upon formation. These polymerized trifunctional silamines are considered to be represented, generally, by the formula:

$$[RSi(NH)_{1.5}]_x \text{ or } [RSi(NR')_{1.5}]_x$$

In the above formula, "R" designates an organic group attached to the silicon atom of which the following are illustrative: (alkyl)-methyl, ethyl, lauryl, isopropyl, tertiary butyl, cyclopropyl, cyclohexyl, and substituted alkyl groups, such as 2-chloroethyl, beta-trichlorosilyl-ethyl; (aryl)-phenyl, alpha or beta-naphthyl and substituted aryl groups, such as para-chlorophenyl, para-trichlorosilyl-phenyl; (aralkyl)-phenethyl; and unsaturated groups (alkenyl) vinyl and allyl, (alkynyl) ethynyl. Also contemplated are organic groups, such as (alkylthio) methylthio, ethylthio; (arylthio) phenylthio; and radicals derived from secondary amines, such as dimethylamino, diethylamino, methylphenylamino. Preferably, "R" is either a monovalent alkyl or aryl group, as such groups have been found, at least at the present time, to have the best stability, especially with respect to hydrolysis.

"R'" designates an organic group acquired from a primary amine if the initial reaction involved aminolysis, illustrative amines being alkyl amines, such as methylamine and ethylamine; allylamine; ethylenediamine; hexamethylenediamine; aryl amines, for example, aniline and para-phenylenediamine; and alkaryl amines like benzylamine.

The number 1.5 in the above formulas indicates that each repeating unit of the polymer contains, on the average, one and one-half nitrogen atoms for each silicon atom in the unit and, correspondingly, one organic group attached to the silicon atom. This may be compared to a repeating unit of a polymerized wholly difunctional-type silamine wherein each unit, on the average, contains one nitrogen atom and two organic groups attached to each silicon atom. Tetrafunctional silamines derived from silicon tetrachloride have no organic groups attached to the silicon. Hybrid copolymers will have intermediate ratios of organic groups vs. nitrogen atoms attached to silicon.

To obtain a reaction product of an amine with a trifunctional silamine as contemplated herein, the reactants may be added together directly or in the presence of an inert solvent, such as methylene chloride, benzene or hexane. Many polymerized trifunctional or hybrid silamines are highly viscous or solid at ordinary temperatures, but may, however, be dissolved in an appropriate solvent of the foregoing type. Frequently, the reaction products are retained in solution with the solvent in which they were formed for further reaction to prevent extensive premature polymerization. In order to obtain the best reaction rate, temperatures of 100° C. or above should be used for the reaction. The reaction with the amine involves the liberation of NH₃ or a lower primary amine, depending upon the method used in forming the silamine, and the transfer of the organic group from the amine to the nitrogen attached to the silicon atom. Actually, the reaction is one of displacement wherein the amine used must have either a higher boiling point or basicity in order to force the reaction in the desired direction. Such a phenomenon is comparable to transesterification reactions involving displacement of the alcoholic component of an ester with an alcoholic component of a different alcohol.

The present reaction permits introduction into the silamine of various organic groups which are otherwise difficult or impossible to introduce at least commercially. Such groups can be used to modify the properties of a silamine, to the extent that built-in characteristics can be obtained for a particular end use. For example, the introduction of higher alkyl groups will tend to plasticize the silamine, whereby a final polymerized product made from the silamine will be less brittle. Further, the use of polyfunctional amines will enable cross-linking of silamines thereby enhancing their ability to cure. Also, the use of polyfunctional amines will permit one of the functional amino groups to react with a silamine under controlled conditions leaving the other functional amino groups available for reaction with a modifying compound, such as an epoxy resin.

Products obtainable by the teachings of this invention could be obtained in some instances by a one-step process wherein an amine having a particular organic group desired might be reacted directly with the basic halosilane. However, such a one-step process frequently presents several distinct disadvantages which are eliminated by the two-step process contemplated herein.

If an amine containing two or more amino groups was reacted directly with a halosilane, the reaction products, in many instances, tend to polymerize immediately and the by-product HCl or amine chloride salt would become bound up in the resin and difficult, if not impossible, to remove from the reaction mass. Also, the higher amines are naturally more expensive and, hence, if a one-step process is employed, the amine chloride formed as a by-product, even if removable, involves at least a temporary loss of a costly reactant as compared to the cheaper ammonia or lower amines.

In the two-step process, either ammonia or a lower weight amine, such as methyl or ethyl amine is generally contemplated, which normally will permit ready and inexpensive removal of the by-product chloride. Further, on subsequent reaction of a higher primary amine with silamines formed from ammonia or a lower molecular weight primary amine, the by-product in the second step is usually a gas which can be easily removed from the reaction mixture. In addition, when using ammonia or a lower alkyl amine, the ammonia or amine may be used advantageously as part of the solvent for the reaction which, of course, would not be possible with the higher amines.

Thus, by way of summary, the present invention contemplates introducing, generally, higher molecular weight primary and secondary amine groups into trifunctional silamines and mixtures or hybrid copolymers of di, tri, and tetrafunctional silamines by initially forming the silamines using ammonia or a relatively low molecular weight primary amine followed by subsequently reacting the silamines with the desired higher molecular weight primary or secondary amine.

It will be appreciated that costs, ease of removal of by-products, etc. will become important in selecting the particular reactants to produce a desired end product. In general, it has been found preferable to initially use a trifunctional halosilane wherein the organic group attached to the silicon is a hydrocarbon radical of the class consisting of alkyls and aryls for the reason that, as indicated previously, such groups usually provide more stability to the resulting silamine compositions.

Both mono and polyfunctional primary and secondary amines may be used, with the polyfunctional amines being preferable because of their wider utility in selectively modifying the silamines. Examples of primary amines are: methyl or ethyl amine, allylamine, ethylenediamine, hexamethylenediamine, aniline, meta or para-phenylenediamine, benzylamine and p,p'-methylenedianiline. Illustrative secondary amines are: dimethylamine, diphenylamine and piperidine. Also, hybrid compounds may be used containing both primary and secondary amino groups, such as triethylenetetramine.

In general, the commercially available aliphatic amines are liquid at room temperature but relatively volatile. This type of amine has been found to give a faster reaction with silamines. The aromatic type amines are usually solid at room temperature and have been found to give somewhat slower reactions with silamines.

Following are illustrative examples of the modification of trifunctional silamines with amines.

*Example 1*

Sixty-seven parts of the trifunctional silamine product formed by the reaction of $C_6H_5SiCl_3$ with $NH_3$ was added to methylene chloride. To this solution was added 33 parts of triethylenetetramine. The solvent was boiled off on a hot plate and the system cured at 150° C. for four hours. A film formed on the surface of the mass within the container with that portion of the mass under the film being somewhat viscous and foamy. Upon further heating for sixteen hours at 150° C., the entire mass cured to a hard state.

*Example 2*

Sixty-seven parts of the trifunctional ammonolysis reaction product of $C_6H_5SiCl_3$ was added to methylene chloride followed by adding 33 parts of p,p'-methylenedianiline. The solvent was boiled off on a hot plate and the system cured at 150° C. for four hours. A hard foam was formed.

*Example 3*

10.8 parts of p,p'-methylenedianiline was added to a methylene chloride solution containing 21.6 parts of the trifunctional ammonolysis reaction product of $CH_3SiCl_3$. After removing the solvent, a portion of the reaction mass was applied to a glass surface and subjected to a temperature of 130° C. for a period of sixteen hours. A clear hardened film formed over the surface covered.

As previously indicated, the trifunctional silamines tend to cross-link readily and, hence, are inclined to set-up into a rather hard state. The difunctional silamines, on the other hand, have less groups available for cross-linking reactions and, accordingly, tend to cure to a softer state. Combination silamines can be prepared having both di and trifunctional groups. Thus, for example, a mixture of $CH_3SiCl_3$ and $(CH_3)_2SiCl_2$ can be ammonolyzed yielding a hybrid silamine having combined functionality. Similarly, combination aliphatic and aromatic hybrids can, likewise, be formed. The addition of a difunctional unit into a trifunctional silamine will reduce the cross-linking characteristics of the trifunctional silamine and, thus, will prevent its curing to a brittle state, thereby serving as a built-in plasticizer. Various tailor-made combinations can, thus, be formed which, when modified by reaction with amines, as contemplated herein, will result in end products having predeterminable properties. Examples of the reaction of amines with such hybrids are as follows.

*Example 4*

A silamine was initially prepared by ammonolyzing a one-to-one mole ratio mixture of $CH_3SiCl_3$ and $$(CH_3)_2SiCl_2.$$

Five grams of the resulting hybrid silamine were mixed with 1.5 grams of ethylenediamine and the mixture heated for four hours in a 150° C. air circulation oven. The resulting product was a hard, rubber-like mass.

*Example 5*

Fifty parts of the silamine, prepared as described in Example 4, were added to 50 parts of p,p'-methylenedianiline. The mass was boiled on a hot plate to clearness and then cured at 140° C. for one hour and at 200° C. for an additional hour. The resulting product was hard and foamy.

*Example 6*

Fifty parts of the silamine, prepared as described in Example 4, were mixed with 50 parts of diallylmelamine, the reaction product being cured at 140° C. for two hours and at 200° C. for one hour. The resulting product was a hard foam at room temperature and a rubbery mass at 200° C.

*Example 7*

A silamine was made by ammonolyzing a mixture of two moles of methyltrichlorosilane and one mole of dimethyldichlorosilane. 34.8 parts by weight of this reaction product was mixed with 17.4 parts by weight of p,p'-methylenedianiline in tetrahydrofuran. This latter mixture was then used to impregnate a standard 181–112 glass fabric, the impregnated fabric then being subjected to a half minute oven cure at 121° C. and a press cure of ninety minutes at 165° C. under thirty tons. The laminate was then subjected to a post cure of two hours at 150° F. This resulted in a laminate with the following properties.

Resin content _____ 32% by weight.
Water absorption _____ 0.37% by weight.
Flexural strength _____ 87,000 p.s.i.
Power factor _____ 0.0027.
Dielectric constant _____ 3.93.
Insulation Resistance _____ 3 million megohms.

The dielectric constant and power factor were determined in accordance with ASTM D150–47T. Flexural strength was determined by using the procedures specified in ASTM D790–49T. Insulation resistance was measured after subjecting the specimen to a relative humidity of ninety percent at a temperature of 40° C. for ninety-six hours.

In general, it has been found that the silamine-amine systems should be boiled to clearness before proceeding with a final cure. Such systems apparently cure with the liberation of ammonia. Where reactions are conducted in a manner which prevents the escape of ammonia, curing will usually not take place at least to any appreciable degree.

In castings, the cure appears to proceed from the surface downward. When curing silamines with aromatic amines, a more uniform cure is noted, possibly due to the fact that such amines react at a slower rate permitting the escape of ammonia. When castings are made, using aliphatic amines as a reactant, surface films tend to form while the main body of the mass below the film is in a partially cured foamy state, apparently due to the inability of the ammonia to break through the relatively hard surface film. However, some control of this phenomenon can be obtained by varying rates of cure and combining mixtures or forming copolymer hybrids of silamines with predeterminable characteristics.

Having described certain exemplary embodiments of the invention, the same is intended to be limited only by the scope of the following claims.

We claim:
1. A process of preparing a composition of matter which comprises reacting: (a) the polymeric reaction product of ammonia and a mixture of halosilanes having the general formula

$$RSiHal_3$$

and $$R_2SiHal_2$$

wherein R is selected from the class consisting of monovalent alkyl, alkenyl and aryl groups, and wherein said polymeric reaction product is characterized by an $$-\underset{|}{\overset{|}{Si}}-NH-\underset{|}{\overset{|}{Si}}-$$

linkage, and (b) an amine selected from the class consisting of primary and secondary aliphatic amines and primary and second aromatic amines, said reaction being conducted under anhydrous conditions at a temperature sufficient to evolve by-product ammonia from the reaction mass as a gas, but below the boiling point of the amine.

2. The process of claim 1 wherein the halogen is chlorine.

3. The process of claim 2 wherein R is selected from the class consisting of methyl and phenyl groups.

4. The process of preparing a composition of matter by reacting (a) the polymeric reaction product of ammonia and a mixture of $$CH_3SiCl_3$$

and $$(CH_3)_2SiCl_2$$

wherein said polymeric reaction product is characterized by an $$-\underset{|}{\mathrm{Si}}-\mathrm{NH}-\underset{|}{\mathrm{Si}}-$$

linkage, and (b) an amine selected from the class consisting of primary and secondary aliphatic amines and primary and secondary aromatic amines, said reaction being conducted under anhydrous conditions at a temperature sufficient to evolve by-product ammonia from the reaction mass as a gas, but below the boiling point of the amine.

5. The process of claim 4 wherein said amine is ethylenediamine.

6. The process of claim 4 wherein said amine is a p,p'-methylenedianiline.

References Cited in the file of this patent

UNITED STATES PATENTS

| | | |
|---|---|---|
| 2,570,185 | Aldrich | Oct. 9, 1951 |
| 2,579,418 | Cheronis | Dec. 18, 1951 |
| 2,876,209 | De Benneville et al. | Mar. 3, 1959 |